Sept. 14, 1948. O. H. WISEGARVER 2,449,438
SOLENOID WITH PLUNGER
Filed July 25, 1944 2 Sheets-Sheet 1
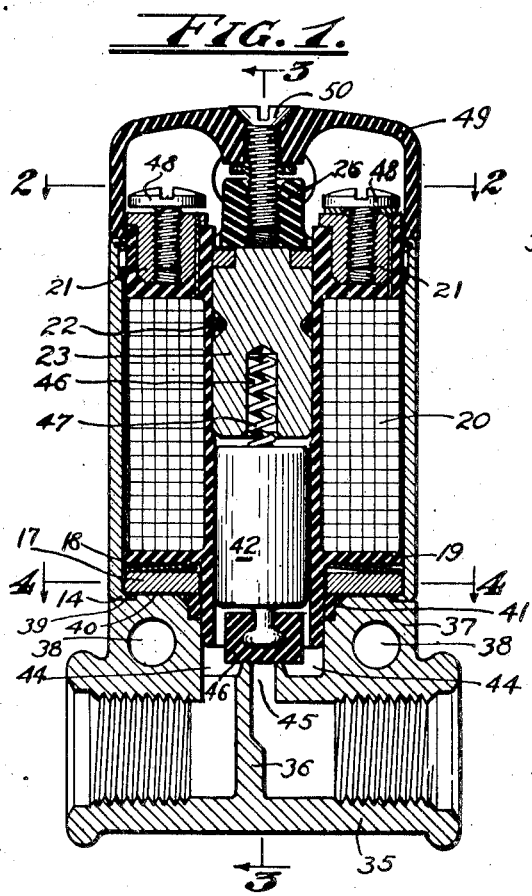
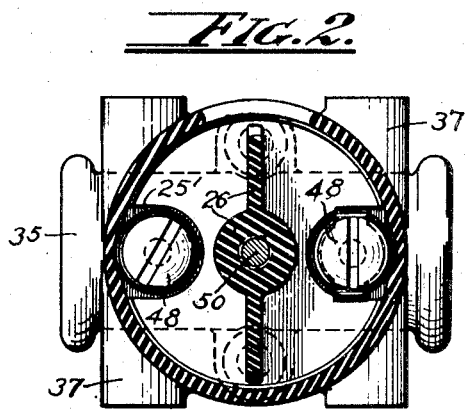
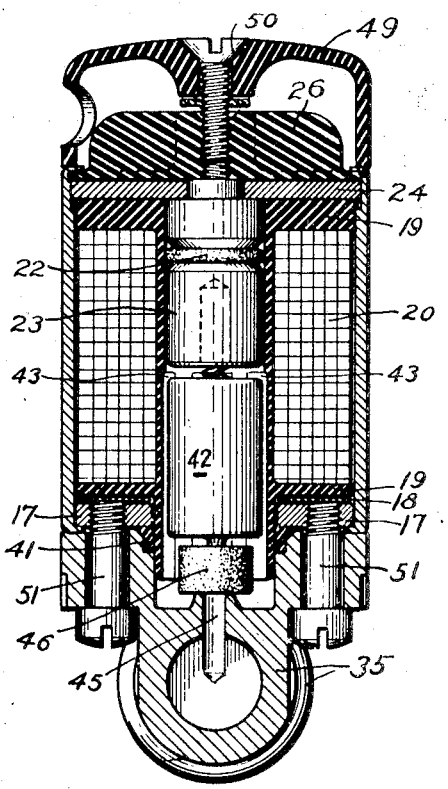
Inventor
Orton H. Wisegarver
By R. S. Burns
Attorney

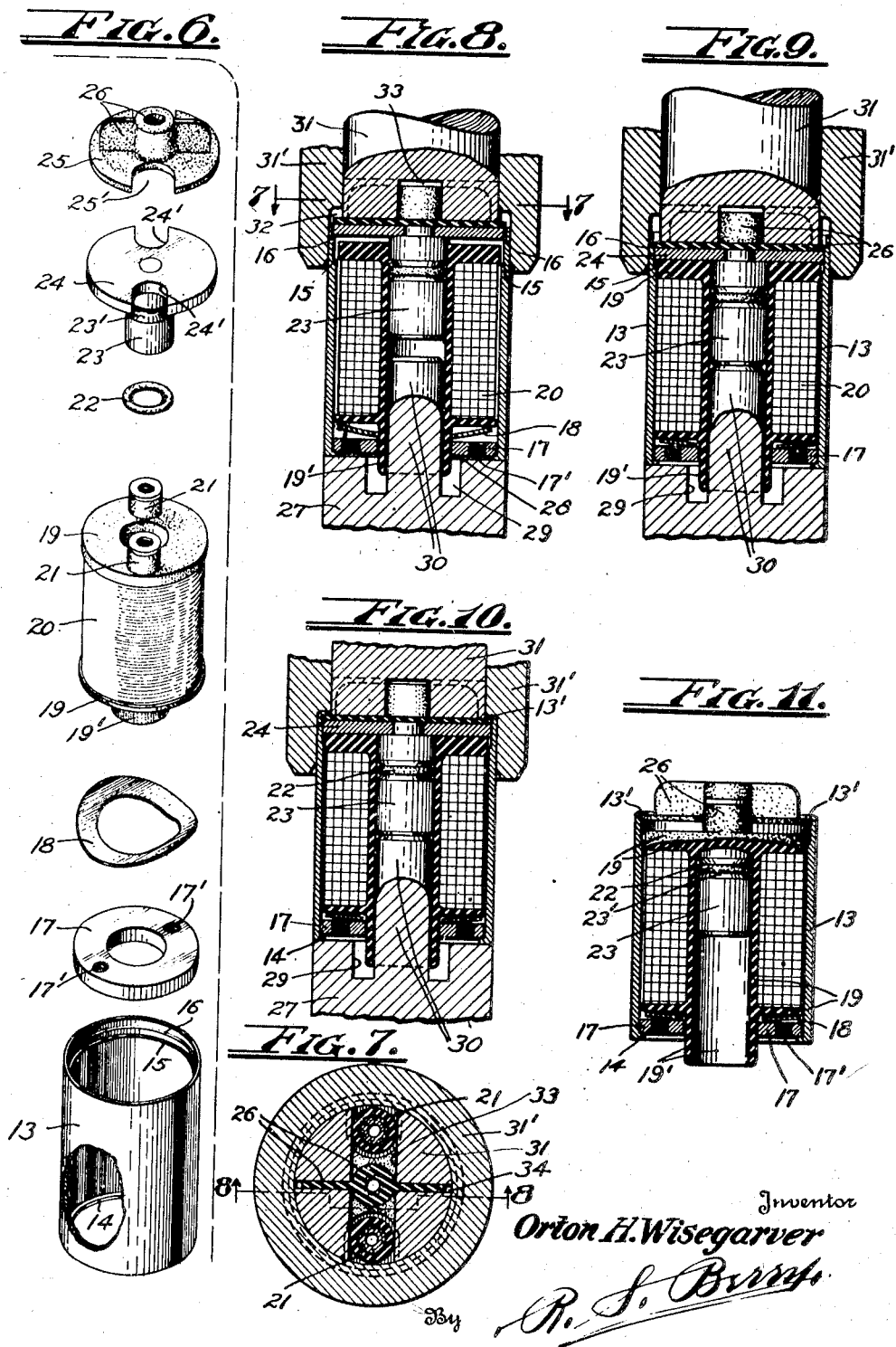

Patented Sept. 14, 1948

2,449,438

UNITED STATES PATENT OFFICE 2,449,438

SOLENOID WITH PLUNGER

Orton H. Wisegarver, Los Angeles, Calif., assignor to Adel Precision Products Corp., a corporation of California Application July 25, 1944, Serial No. 546,541

6 Claims. (Cl. 175—341)

This invention relates to solenoid with plunger, and it has among its salient objects:

To provide an improved solenoid construction for use in hydraulic systems, which is simple, practical and efficient in accuracy, and which, by reason of its construction and arrangement, and its means for connection with a valve or other member to be operated thereby, makes possible the following objects and advantages, to-wit:

Uniformity in the location of a stop for limiting the movement of the armature; a fluid tight construction for an armature which moves in a liquid under pressure; a solenoid capable of quick and accurate connection with a valve body or casting and which can be machined to close tolerances to limit the movement of the armature thereof to a predetermined point; connecting means therefor which makes possible rotative adjustment of the solenoid on the body to which it is attached and to do this without disturbance of said body upon its support or connection; a design of armature and guide therefor whereby to secure accurate movement thereof with a minimum of friction area therebetween, with means for permitting movement of fluid past said armature as it moves in a fluid; an improved solenoid body or spool which can be readily mounted upon an arbor, to be turned thereby, for winding purposes, without other holding means.

Another object attained is a design of valve body for use with a solenoid-controlled valve, whereby the same body or casting is capable of having a variety of sizes of flow openings therein; a connection between the solenoid and the valve body whereby an effective sealing means is made possible and leakage of fluid prevented, and which sealing means will also permit rotative adjustment of the solenoid upon the valve body, before referred to.

I have also provided a clamping means for connecting the valve body and the solenoid which operates to put pressure upon the fluid sealing means.

Another object is a solenoid spool and its terminals in which a wire from one terminal can be wound on the spool and then connected to the other terminal, with terminals so formed that a grounding strap of simple design can be readily applied thereto for a single wire system, without other change in the system, and, in general, to provide a method of construction and arrangement which will make possible and practical the assembly of the parts to a predetermined dimension between the armature stop within the core of the solenoid coil and the abutment upon which it is mounted on the valve body, together with a compression spring washer to maintain the solenoid coil tightly assembled within the supporting casing, and which also prevents the assembly screws from injuring the solenoid spool.

In order to explain my invention more completely, I have illustrated the same on the accompanying two sheets of drawings, which I will now describe:

Fig. 1 is a vertical sectional view taken through a solenoid and valve construction embodying my invention;

Fig. 2 is a transverse sectional view taken on line 2—2 of Fig. 1;

Fig. 3 is a vertical sectional view taken on line 3—3 of Fig. 1;

Fig. 4 is a transverse sectional view taken on line 4—4 of Fig. 1;

Fig. 5 is a fragmentary, sectional view showing the application of a grounding strap to one of the solenoid terminals;

Fig. 6 is an exploded view showing all of the parts of the solenoid in separated relationships;

Fig. 7 is a cross sectional view taken on line 7—7 of Fig. 8;

Fig. 8 is a sectional view taken on line 8—8 of Fig. 7; showing the parts of the dies used in assembling the parts in one stage of the assembly;

Fig. 9 shows the same parts in another stage;

Fig. 10 shows the same parts in another stage; and

Fig. 11 shows the parts assembled apart from the assembling dies, and without the armature therein.

Referring in detail to the drawings, and particularly to Figs. 6 to 11 inclusive, I will describe the several parts which make up my improved solenoid construction and arrangement.

In Fig. 6, is shown the outer cylinder 13, having in its lower end the inturned flange 14, and at its upper end two enlargements forming the annular shoulders 15 and 16. A part of the side is broken out of this view to show the flange 14.

Fitted in the bottom of this cylinder is an attaching ring 17, having the threaded holes 17', and upon this attaching ring is placed a compression spring washer 18, upon which is placed the solenoid spool 19, with its winding 20, and terminals 21, 21, as shown.

A sealing ring 22, is placed around the stem portion or stop member 23, provided with an annular groove 23' therefor, the entire member being designated 24, and adapted to fit down into the upper end of the cylinder 13, as again referred to. Said member is provided at its opposite sides with openings 24', 24' for clearance of terminals, again referred to.

A top member 25, of insulating material, with the openings 25', 25', is shown provided with an upstanding boss with opposite wing portions, designated together 26.

These parts are shown in complete assembly in Fig. 11, and in which said parts are designated by the same reference numerals. Referring now to Figs. 8, 9 and 10, I will describe the method of assembling said parts in order that the accuracy and uniformity for locating the stop which limits the movement of the armature, the fluid tight construction and rotative adjustment is made possible.

Assembling dies are used to accomplish these functions with accuracy. A holding die 27 is shown in the views referred to, and this die has an annular flat face 28, an annular clearance space 29, to receive the lower, projecting end of the solenoid spool, designated 19', and the central upstanding guide 30, over which said spool is placed as shown.

A compressing die 31 is shown in said Figs. 8, 9 and 10, for compressing said parts into their proper positions and for crimping the upper edge of the cylinder 13 over in holding position, as shown.

This compressing die has an outer part 31' which fits down over the upper end of the cylinder 13 with a close sliding fit, as indicated, and the die or punch proper 31 which extends down into the outer part 31' as shown, leaving the annular space 32, said die proper having a flat face with a wide cross slot 33 and a narrower slot 34 at right angles thereto, whereby to fit down over the boss with wings, designated 26, and as indicated in light broken lines, and shown more clearly in Fig. 7.

In Fig. 8, the several parts are shown together loosely, ready to be pressed down into their final positions. In Fig. 9 the punch 31 has been moved down to press the spool 19 down into the cylinder 13, below the annular shoulder 15 therein, and the member 24 is pressed down upon said shoulder 15, and the member 26 is pressed down upon the upper shoulder 16, within said cylinder 13. At the same time the spring compression washer 18 is somewhat compressed.

In Fig. 10, the compression has continued until the die part 31' has crimped over the upper edge of the cylinder 13.

Thus said parts are all compressed upon the lower die 27, and upon the upper end of the upstanding guide and gauge 30, whereby to determine the fixed positions of the several parts and to determine the location of the stop 23 for limiting the movement of the armature, as before referred to. The assembled parts are seen in Fig. 11. They are thus held in this assembled position by the inturned flanges 14 and 13' at the lower and upper ends of the cylinder 13.

Referring now to Figs. 1 to 5 inclusive, I will describe the application of the invention to a valve designed to be connected into a hydraulic system for regulating or controlling the flow of the fluid of said system.

The valve body or casting is designated 35, with its opposite ends threaded for connection with a pipe system, with a partition wall 36 therein, and with the top, as here shown, provided with the extended portions 37, 37, with bores 38, 38, therethrough lengthwise.

The top of this body can be machined to receive the lower end of the assembled parts, shown in Fig. 11, and so that the lower inturned flange 14, fits closely thereupon, on a narrow annular face, as 39, while a wider annular face 40 extends upwardly within said flange 14, to bear up under the attaching ring 17, which has a slight yielding movement by reason of the spring compression washer 18.

Around the inner side of this annular face 40 is formed an annular recess or seat to receive the annular gasket, or packing, 41, fitting into the angle between the lower end of the spool extension 19, said attaching ring 17, and said valve body extension 37, to provide a fluid tight joint and to prevent leakage of the fluid from the valve and from within the spool, where the armature 42 moves in said fluid. It also permits rotative adjustment of the solenoid.

By referring to Fig. 4, it will be seen that the armature 42, shown in section, moves in a part of the spool provided with longitudinally extending channels, as 43, to permit the movement of the fluid around the armature as it is moved therein. These channels are also seen in Fig. 3.

The valve body, it will be seen, is open in its center top to receive the spool extension 19, and to form a connecting chamber 44 above the wall 36, and forming a communication between the opposite ends of said valve body, through a bore 45, which can be of the desired size to permit the proper flow of the hydraulic fluid through said valve body.

In Fig. 1, I have shown the armature 42 provided with a valve element 46, attached thereto and moving therewith, as indicated, and seating upon the upper end of the bore 45, to open and close passageway through the valve body.

The stem 23 of the member 24, projecting down into the spool 19, and forming a stop for the armature, as seen in Fig. 1, is provided with a central bore 46 to receive a coiled spring 47, the lower end of which engages the upper end of the armature, and cushions it as it reaches the stop 23.

Referring to Fig. 1, the terminals 21, 21, of the solenoid, are shown in section, with the eccentrically positioned terminal screws 48, 48, therein. There is also shown a covering cap 49, held in place with a screw 50, screwed down into the center of the member 26, seen in Fig. 6, and Figs. 2 and 3.

In Fig. 3, which is taken at right angles to the showing in Figs. 1, the attaching screws 51, 51, are shown, securing the valve body to the attaching ring 17, held in the bottom of the cylinder 13, and resting upon the inturned flange 14, and upon the annular face 40 of the valve body, 37, as shown. This arrangement makes possible rotative adjustment of the solenoid relative to the valve without disturbance of said valve body, so that connection may more conveniently be made with the wires which supply the electric current. The compression spring washer 18, facilitates this adjustment feature, and also prevents the ends of the screws 51, 51, from engaging or injuring the lower end of the spool 19, of the solenoid winding.

By reference to Fig. 5, it will be seen that a grounding cap-like element 52 is placed over the terminal 21, with its bent down ends bearing on the member 24. The terminal screw 48 secures said grounding element 52 firmly in place. This is used in a single wire connection and where one terminal is grounded.

With the foregoing description of the construction and arrangement, as illustrated in the drawings, I am able to accomplish the objects and purposes set forth in the beginning of this specification, but I do not limit myself to the details described, except as I may be limited by a broad construction of the hereto appended claims.

I claim:

1. In solenoid construction, a cylinder open at one end, an attaching member rotatably confined therein for attaching the solenoid to another member, a compression member bearing against said attaching member, a solenoid spool, with winding and terminals, fitted within said cylinder and bearing against said compression member, and means closing the other end of said cylinder with compression upon said solenoid spool and said compression member, whereby said solenoid can be rotatively adjusted relative to said attaching member.

2. In solenoid construction, a cylinder open at one end, an attaching member rotatively confined therein for attaching the solenoid to another member, a compression spring washer bearing against said attaching member, a solenoid spool, with winding and terminals, fitted within said cylinder and bearing against said spring washer, and means closing the other end of said cylinder with compression upon said solenoid spool and said spring washer, whereby said solenoid can be rotatively adjusted relative to said attaching member, said means including a stop member extended down into said solenoid spool as a limit stop for an armature, and an armature therein.

3. In solenoid construction, a cylinder open at its attaching end, an attaching ring rotatively mounted therein for attaching said solenoid to another member, a spring compression washer bearing against said attaching ring, a solenoid spool, complete with winding and terminals, mounted therein against said spring washer, said spool extending through said attaching ring, and means closing the terminal end of said solenoid with compression on said spring washer.

4. A solenoid adapted to be attached to another member to actuate the latter, said solenoid having an attaching member rotatively confined in the open end thereof, and a spring compression washer therein, bearing against said attaching member, whereby said solenoid can be rotatively adjusted relative to said attaching member and be frictionally retained in adjusted position.

5. In solenoid construction, a cylinder open at both ends, an attaching ring rotatively confined in one end thereof for attaching said solenoid to a valve body, a compressible element upon said attaching ring, a solenoid spool, with winding and terminals, in said cylinder upon said compressible element, a member having a part to fit down into said solenoid spool to form a limit stop for an armature, an armature movable in said solenoid spool below said stop, and means compressing and holding said parts together in said cylinder to a predetermined stop limit for said armature.

6. In solenoid construction, a cylinder having one end provided with an inner retaining flange, an attaching ring rotatably confined therein upon said flange, for attaching said solenoid to another member, whereby said solenoid can be rotated for adjustment relative to said attaching ring and said other member, a solenoid spool within said cylinder, upon said attaching member, with a compressible member therebetween to permit limited yielding therebetween, a member mounted upon said spool and having a stop element extended thereinto to form a limit stop for an armature, and means holding said parts compressed together with predetermined uniformity to predetermine the position of said stop element for the armature, and an armature operable in said spool below said stop.

ORTON H. WISEGARVER.

REFERENCES CITED

The following references are of record in the file of this patent:

UNITED STATES PATENTS

| Number | Name | Date |
|---|---|---|
| 1,685,059 | Bailey | Sept. 18, 1928 |
| 1,823,430 | Rabezzana | Sept. 15, 1931 |
| 2,003,464 | Rabezzana | June 4, 1935 |
| 2,129,962 | Rabezzana | Sept. 13, 1938 |
| 2,142,366 | Mitschrich | Jan. 3, 1939 |
| 2,222,419 | McCarty | Nov. 19, 1940 |
| 2,291,599 | Ray | Aug. 4, 1942 |
| 2,350,352 | Harding | June 6, 1944 |
| 2,350,475 | Rabezzana | June 6, 1944 |
| 2,353,835 | Lane | July 18, 1944 |